United States Patent [19]
Chiba et al.

[11] Patent Number: 4,499,247
[45] Date of Patent: Feb. 12, 1985

[54] HIGH-RIGIDITY, HIGH-MELT-VISCOELASTICITY POLYPROPYLENE AND PROCESS FOR PRODUCING THE SAME

[75] Inventors: Hiromasa Chiba; Kenjiro Obama; Shunji Kawazoe; Takahiro Oka; Akihiro Satoh, all of Ichiharashi, Japan

[73] Assignee: Chisso Corporation, Osaka, Japan

[21] Appl. No.: 501,893

[22] Filed: Jun. 7, 1983

[30] Foreign Application Priority Data

Jun. 15, 1982 [JP] Japan .................. 57-102907

[51] Int. Cl.$^3$ .................. C08F 4/64; C08F 10/06
[52] U.S. Cl. .................. 526/142; 502/127; 526/114; 526/116; 526/119; 526/122; 526/65; 526/351; 526/905
[58] Field of Search .................. 526/65, 142, 351, 905

[56] References Cited

U.S. PATENT DOCUMENTS

| 4,309,521 | 1/1982 | Sato et al. | 526/351 |
| 4,420,593 | 12/1983 | Sato et al. | 526/142 |

FOREIGN PATENT DOCUMENTS

| 54-38389 | 3/1979 | Japan | 526/905 |
| 56-70014 | 6/1981 | Japan . | |
| 2094319 | 9/1982 | United Kingdom | 526/65 |

Primary Examiner—Edward J. Smith
Attorney, Agent, or Firm—Fred Philpitt

[57] ABSTRACT

A superior high-rigidity and high-melt-viscoelasticity polypropylene for sheets to be post-processed and for blow molding is provided which polypropylene is produced by subjecting propylene to a multi-stage polymerization into polymer portions of two sections in the presence of a specified Ziegler Natta catalyst, the relationship between the intrinsic viscosities of the polymer portions of the respective sections being regulated within a specified range and also the amount ratio of the polymer portions of the respective sections being regulated.

6 Claims, No Drawings

HIGH-RIGIDITY, HIGH-MELT-VISCOELASTICITY POLYPROPYLENE AND PROCESS FOR PRODUCING THE SAME

BACKGROUND OF THE INVENTION

1. Field of the Invention

This invention relates to a high-rigidity, high-melt-viscoelasticity polypropylene for post-processed sheets and blow molding, and a process for producing the same. More particularly, it relates to a polypropylene having high-rigidity and high-melt-viscoelasticity at the same time, obtained by subjecting propylene to a multi-stage polymerization in the presence of a specified catalyst so that the resulting polypropylene can comprise polymer portions of two sections having specified melt flow indexes, and a process for producing the same.

Further the present invention also relates to a polypropylene having a superior sheet-post-processability (often referred to as sheet-formability), and a process for producing the same.

2. Description of the Prior Art

Sheets produced by processing known polypropylene have various drawbacks that at the time of molding by heat for post-processing (or secondary processing), the resulting sheet sags rapidly the ranges of processing conditions are narrow; the molding efficiency is inferior; sag of wide sheets is large; the thickness of post-processed products is liable to be non-uniform; overlying wrinkles are liable to be formed; etc. Thus, only small-type molded products could have been produced. On the other hand, when known polypropylene is used for blow molding, the following problems are raised:

(1) Since the sag of parison at the time of the molding is large, the thickness of the resulting molded products is non-uniform and hence blow molding process can be applied only to small-type products; (2) if a higher molecular weight polypropylene is used for preventing the above-mentioned sag, an inferior fluidity, a large amount of charge at the time of the molding, a great loss of energy and mechanical troubles may be caused and also the resulting molded products have a notable surface roughening to lose their commodity value; etc. In order to improve the above-mentioned sheet-formability and blow moldability of polypropylene, various processes have so far been proposed. For example, Japanese patent publication No. Sho 47-80614/1972 and Japanese patent application laid-open No. Sho 50-8848/1975 disclose a process of blending low density polyethylene or the like with polypropylene. However, molded products produced from such a mixture are liable to cause surface roughening, and in order to prevent it, a powerful kneading is required at the time of melting; thus the process has to be restricted in the aspect of choice of kneaders and power consumption. Further Japanese patent application laid-open No. Sho 56-70014/1981 discloses a two-stage copolymerization process wherein a difference in the molecular weight as well as a difference in the polymer amount are afforded between the polymer portions formed at the respective stages. However, the melt flow characteristics of the copolymer obtained according to the process are insufficient. Furthermore Japanese patent application laid-open No. Sho 55-118906/1980 discloses a process for making definite the relationship between the melt flow ratio and the melt flow rate of polypropylene. In the case of the process, however, the relationship of the melt flow rate with the melt flow characteristics is not taken into consideration, and the swell ratio (SR), too, cannot be primarily determined relative to the extrusion shear rate of polypropylene; hence the process cannot always correspond to the improvement in various processing characteristics relative to the present invention.

Further, since known polypropylene is lower in rigidity and softer than polystyrene, ABS resin or the like, it is impossible to use it as a stock for molded products needing higher rigidity and higher hardness; hence this has caused a serious bottleneck in extending the application fields of polypropylene.

If it is possible to improve the rigidity of polypropylene, it is possible to reduce the thickness of molded products, which is not only effective for resources-saving but also makes its cooling rate at the time of molding higher; hence it is also possible to make the molding rate per unit time higher, which contributes to improving the productivity in molding and processing.

As a known art for improving the rigidity of crystalline polypropylene, for example, there is a process of adding an organic neuclus-creating agent such as aluminum para-t-butylbenzoate, 1,3- or 2,4-dibenzylidenesorbitol, etc. to polypropylene and molding the mixture, but the process has such drawbacks that the cost is high and hence uneconomical, and moreover, the luster, impact strength, tensile elongation, etc. are greatly reduced. As another means for improving the rigidity, there is a process of using various inorganic fillers such as talc, calcium carbonate, mica, barium sulfate, asbestos, calcium silicate, etc., but this process has such drawbacks that the light weight property and transparency specific of polypropylene are not only damaged, but also the impact strength, luster, tensile strength, additive property, etc. are lowered. As a technique of using polypropylene having a higher isotacticity for obtaining high-rigidity molded products (Japanese patent application laid-open No. Sho 55-81125), but polypropylene used therein has an isotacticity in the range of those according to conventional art; hence the effectiveness of improving the rigidity of molded products is still insufficient.

In view of the present status of the above-mentioned known art, the present inventors have made strenuous studies in order to improve sheet formability, blow processability and rigidity of polypropylene to thereby solve the above-mentioned problems of known art, and as a result, have found that when propylene is subjected to a multi-stage polymerization into polymer portions of two sections, in the presence of a specified catalyst; the relationship between the intrinsic viscosities of the polymer portions of the respective sections is regulated within a specified range; and further the amount ratio of the polymer portions of the respective sections is regulated, then it is possible to obtain a polypropylene having a notably high-rigidity and a notably superior sheet-post-processability and blow moldability. Thus the present invention has been completed.

As apparent from the foregoing, an object of the present invention is to provide a polypropylene having a superior sheet-post-processability, blow moldability and high-rigidity, which have been deficient in known kinds of polypropylene, and a process for producing the same. Another object of the present invention is to extend concrete application fields of polypropylene for sheet molded products and blow molded products and make production of molded products of good quality easier.

SUMMARY OF THE INVENTION

The present invention resides in two aspects composed of the following items (1) to (12):

(1) a high-rigidity and high-melt-viscoelasticity polypropylene for sheets to be post-processed and for blow molding, obtained by subjecting propylene to a multi-stage polymerization in the presence of a catalyst prepared by reacting an organoaluminum compound (I) or a reaction product (VI) of an organoaluminum compound (I) with an electron donor (A), with TiCl$_4$ (C); reacting the resulting solid product (II) with an electron donor (A) and an electron acceptor (B); and combining the resulting solid product (III) with an organoaluminum compound (IV) and an aromatic carboxylic acid ester (V), so as to give a molar ratio (V/III) of the aromatic carboxylic acid ester to the solid product (III) of 0.1 to 10.0;

in this polymerization, adjusting the amount of propylene polymerized at the first stage so as to constitute 35 to 65% by weight based on the total amount polymerized and that at the second stage et seq so as to constitute 65 to 35% by weight based thereon; and when the intrinsic viscosity of the polymer portion having a higher molecular weight is named $[\eta]_H$ and that having a lower molecular weight is named $[\eta]_L$, between the polymer portion formed at the first stage and that formed at the second stage et seq, adjusting the intrinsic viscosity values of the respective polymer portions so as to satisfy a relationship $$3.0 \leq [\eta]_H - [\eta]_L \leq 6.5 \tag{1};$$

(2) a polypropylene according to the item (1), having a melt flow index (MI) in the range of 0.03 to 2.0 g/10 min.;

(3) a polypropylene according to the item (1) wherein said organoaluminum compound (IV) is a dialkylaluminum monohalide;

(4) a polypropylene according to the item (1) wherein an α-olefin is reacted with the combination of said solid product (III) with said organoaluminum compound (IV) and the resulting preactivated catalyst is used;

(5) a polypropylene according to the item (1) wherein the relationship between its isotactic pentad ratio (P) and MFR is adjusted to be in the range of $$1.0a \geq P \geq 0.015 \log \text{MFR} + 0.955;$$

(6) a polypropylene according to the item (1) wherein the relationship between its melt flow index (HMI) (10.8 Kg/10 min., 230° C.) and melt flow index (MI) (2.16 Kg/10 min., 230° C.) is adjusted to satisfy an equation $$\log \text{HMI} - 0.922 \log \text{MI} \geq 1.44 \tag{2};$$

(7) a process for producing a high-rigidity and high-melt-viscoelasticity polypropylene for sheets to be post-processed and for blow molding, which process comprises subjecting propylene to a multi-stage polymerization in the presence of a catalyst prepared by reacting an organoaluminum compound (I) or a reaction product of an organoaluminum compound (I) with an electron donor (A), with TiCl$_4$ (C); reacting the resulting solid product (II) with an electron donor (A) and an electron acceptor (B); and combining the resulting solid product (III) with an organoaluminum compound (IV) and an aromatic carboxylic acid ester (V), so as to give a molar ratio (V/III) of the aromatic carboxylic acid ester to the solid product (III) of 0.1 to 10.0;

in this polymerization, adjusting the amount of propylene polymerized at the first stage so as to constitute 35 to 65% by weight based on the total amount polymerized and that at the second stage et seq so as to constitute 65 to 35% by weight based thereon; and when the intrinsic viscosity of the polymer portion having a higher molecular weight is named $[\eta]_H$ and that having a lower molecular weight is named $[\eta]_L$, between the polymer portion formed at the first stage and that formed at the second stage et seq, adjusting the intrinsic viscosity values of the respective polymer portions so as to satisfy a relationship $$3.0 \leq [\eta]_H - [\eta]_L \leq 6.5 \tag{1};$$

(8) a process for producing a polypropylene according to the item (7), having a melt flow index (MI) in the range of 0.03 to 2.0 g/10 min.;

(9) a process for producing a polypropylene according to the item (7) wherein said organoaluminum compound (IV) is a dialkylaluminum monohalide;

(10) a process for producing a polypropylene according to the item (7) wherein an α-olefin is reacted with the combination of said solid product (III) with said organoaluminum compound (IV) and said aromatic carboxylic acid ester, and the resulting preactivated catalyst is used;

(11) a process for producing a polypropylene according to the item (7) wherein the relationship between its isotactic pentad ratio (P) and MFR is adjusted to be in the range of $$1.0a \geq P \geq 0.015 \log \text{MFR} + 0.955; \text{ and}$$

(12) a process for producing a polypropylene according to the item (7) wherein the relationship between its melt flow index (HMI) (10.8 Kg/10 min., 230° C.) and melt flow index (MI) (2.16 Kg/10 min., 230° C.) is adjusted to satisfy an equation $$\log \text{HMI} - 0.922 \log \text{MI} \geq 1.44 \tag{2}.$$

DETAILED DESCRIPTION OF THE PREFERRED EMBODIMENTS

Polypropylene of the present invention is produced as follows: Propylene is polymerized at at least two stages, using a catalyst comprising a specified titanium trichloride composition, an organoaluminum compound, an aromatic carboxylic acid ester and a molecular weight modifier, that is, one of the so-called Ziegler-Natta catalysts. As for the titanium trichloride composition, an organoaluminum compound (I) or a reaction product (VI) of an organoaluminum compound (I) with an electron donor (A) is reacted with TiCl$_4$ (C) to obtain a solid product (II), which is then subjected to the following treatment to obtain a solid product (III) which is used as the above composition. (Note: I, II, III, VI, A, C, etc. are symbols of the present invention for identifying the raw materials for the catalyst preparation or intermediates, and this applies to the following.)

Even if this solid product (III) is replaced by other titanium trichloride compositions, it is impossible to attain the object of the present invention.

The solid product (III) is prepared as follows: First, (i) an organoaluminum compound (I) is reacted with TiCl₄ (C) or (ii) a reaction product (VI) of the former with an electron donor (A) is reacted with the latter, to prepare a solid product (II). The process (ii) can afford a titanium catalyst component which is finally more desirable.

The process (ii) is described in the specification of Japanese patent application No. Sho 55-12875/1980 (Japanese patent application laid-open No. Sho 56-110707/1981) as follows:

The reaction of an organoaluminum compound (I) with an electron donor (A) is carried out in a solvent (D) at −20° C. to 200° C., preferably −10° C. to 100° C. for 30 seconds to 5 hours. The addition order of (I), (A) and (D) has no particular limitation, and the ratios of used amounts are suitably 0.1 to 8 mols, preferably 1 to 4 mols of an electron donor and 0.5 to 5 l, preferably 0.5 to 2 l of a solvent, each per one mol of the organoaluminum compound. As the solvent, aliphatic hydrocarbons are preferred. Thus a reaction product (VI) is obtained. This reaction product (VI) may be subjected to the subsequent reaction, without separating it, that is, in a liquid state after completion of the reaction as it is (which will hereinafter often be referred to as reaction liquid (VI)).

The reaction of the reaction product (VI) with TiCl₄ (C) is carried out at 0° to 200° C., preferably 10° to 90° C., for 5 minutes to 8 hours. Although it is preferred not to use any solvent, aliphatic or aromatic hydrocarbons may be used. Mixing of (VI), (C) and the solvent may be carried out in any order, and mixing of the total amount is preferably completed within 5 hours. It is preferred that after the mixing of the total amount, the reaction be further continued at 10° C. to 90° C. within 8 hours. As for the amounts of the respective materials used for the reaction, the amount of the solvent is 0 to 3,000 ml based on one mol of TiCl₄ and the amount of the reaction product (VI) is 0.05 to 10, preferably 0.06 to 0.2 in terms of a ratio (Al/Ti) of the number of Al atoms contained in (VI) to the number of Ti atoms contained in TiCl₄, based on one mol of TiCl₄. After completion of the reaction, the liquid portion is separated and removed by filtering off or decantation, followed by repeated washings with a solvent. The resulting solid product (II) may be used in the succeeding step in a state where it is suspended in a solvent as it is, or it may be further dried, taken out in the form of solids and used.

The solid product (II) is then reacted with an electron donor (A) and an electron acceptor (B). Although this reaction may be carried out even without any solvent, use of aliphatic hydrocarbons affords a preferable result. As for the amounts of these materials used, the amount of (A) is 10 to 1,000 g, preferably 50 to 200 g, the amount of (B) is 10 to 1,000 g, preferably 20 to 500 g, and the amount of the solvent is 0 to 3,000 ml, preferably 100 to 1,000 ml, each based on 100 g of the solid product (II). It is preferred that these three or four materials be mixed at −10° to 40° C. for 30 seconds to 60 minutes, and reacted at 40° to 200° C., preferably 50° to 100° C. for 30 seconds to 5 hours. The mixing order of the solid product (II), (A), (B) and the solvent has no particular limitation. (A) and (B) may be reacted together in advance of mixing them, and in this case, (A) and (B) is reacted together at 10° to 100° C. for 30 minutes to 2 hours, and the resulting reaction product is cooled down to 40° C. or lower and used. After completion of the reaction of the solid product (II) with (A) and (B), the liquid portion is separated and removed from the reaction mixture by filtering off or decantation, followed by repeated washings with a solvent for removing unreacted liquid raw materials to obtain a solid product (III). This solid product (III) is dried and taken out in the form of solids, or it is used in the succeeding step in a state where it is suspended in a solvent, as it is.

The thus obtained solid product (III) is combined with 0.1 to 500 g of an organoaluminum compound and a definite amount of an aromatic ester mentioned below based on 1 g of the product (III), to prepare a catalyst, or more preferably, it is preactivated by reacting it with an α-olefin and thereafter the ester is added to prepare a catalyst of the present invention.

The organoaluminum compounds (IV) used in this invention are expressed by the general formula

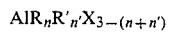

$$AlR_nR'_{n'}X_{3-(n+n')}$$

(wherein R and R' each represent hydrocarbon groups such as alkyl group, aryl group, alkaryl group, cycloalkyl group, etc. or alkoxy groups, X represents a halogen atom such as F, Cl, Br and I, and n and n' each represent an optional number satisfying a condition of $0 < n+n' \leq 3$). As for concrete examples, trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohydrides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum hydrides such as diethylaluminum hydride, alkylaluminum halides such as methylaluminum sesquichloride, ethylaluminum sesquichloride, ethylaluminum dichloride, i-butylaluminum dichloride, etc. are mentioned, and besides, alkoxyalkylaluminums such as monoethoxydiethylaluminum, diethoxymonoethylaluminum, etc. can be also employed. These organoaluminum compounds may be used in admixture of two or more kinds. The organoaluminum compound (I) for obtaining the solid product (VI) may be the same as or different from the organoaluminum compound (IV) to be combined with the solid product (III).

As the electron donor (A) used in the present invention, various compounds mentioned below are illustrated, but it is preferred to use mainly ethers and use other electron donors together with ethers. Compounds used as the electron donor are organic compounds containing at least one atom selected from oxygen, nitrogen, sulfur and phosphorus, such as ethers, alcohols, esters, aldehydes, carboxylic acids, ketones, nitriles, amines, amides, ureas, thioureas, isocyanates, azo compounds, phosphines, phosphites, phosphinites, thioethers, thioalcohols, etc. As for concrete examples, ethers such as diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran, etc., alcohols such as methanol, ethanol, propanol, butanol, pentanol, hexanol, octanol, etc., phenols such as phenol, cresol, xylenol, ethylphenol, naphthol, etc., esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphtoate, ethyl naphthoate, propyl naphthoate, butyl naphthoate, 2-ethylhexyl naphthoate, ethyl phenylacetate, etc., aldehydes such as acetaldehyde, benzaldehyde, etc., fatty acids such as formic acid, acetic acid, propionic acid, butyric acid, oxalic acid, succinic acid, acrylic acid, maleic acid, aromatic acid such as benzoic acid, etc., ketones such as methyl ethyl ketone, methyl isobutyl ketone, benzophenone, etc., nitriles such as acetonitrile, etc., amines such as methylamine, diethylamine, tributylamine, triethanolamine, β(N,N-dimethylamino)ethanol, pyridine, quinoline, α-picoline, N,N,N',N'-tetramethylhexaethylenediamine, aniline, dimethylaniline, etc., amides such as formamide, hexamethylphosphoric acid triamide, N,N,N',N',N''-pentamethyl-N'-β-dimethylaminomethylphosphoric acid triamide, octamethylpyrophosphoroamide, etc., ureas such as N,N,N',N'-tetramethylurea, etc., isocyanates such as phenylisocyanate, toluylisocyanate, etc., azo compounds such as azobenzene, etc., phosphines such as ethylphosphine, triethylphosphine, tri-n-butylphosphine, tri-n-octylphosphine, triphenylphosphine, triphenylphosphine oxide, etc., phosphites such as dimethylphosphite, di-n-octylphosphite, triethylphosphite, tri-n-butylphosphite, triphenylphosphite, etc., phosphinites such as ethyldiethylphosphinite, ethyldibutylphosphinite, phenyldiphenylphosphinite, etc., thioethers such as diethyl thioether, diphenyl thioether, methyl phenyl thioether, ethylene sulfide, propylene sulfide, etc., thioalcohols such as ethyl thioalcohol, n-propyl thioalcohol, thiophenol, etc., and the like can be illustrated.

The electron acceptor (B) used in the present invention is represented by halides of elements of groups III~VI of the Periodic Table. Concrete examples are anhydrous $AlCl_3$, $SiCl_4$, $SnCl_2$, $SnCl_4$, $TiCl_4$, $ZrCl_4$, $PCl_3$, $PCl_5$, $VCl_4$, $SbCl_5$. They may also be used in admixture. The most preferable compound is $TiCl_4$.

As the solvent, the following are used: as aliphatic hydrocarbons, n-heptane, n-octane, i-octane, etc. are illustrated, and in place of or together with aliphatic hydrocarbons, halogenated hydrocarbons such as carbon tetrachloride, chloroform, dichloroethane, trichloroethylene, tetrachloroethylene, etc. may also be used. Aromatic compounds such as aromatic hydrocarbons, e.g. naphthalene, alkyl-substitutes as their derivatives such as mesitylene, durene, ethylbenzene, isopropylbenzene, 2-ethylnaphthalene, 1-phenylnaphthalene, etc., halides e.g. monochlorobenzene, o-dichlorobenzene, etc. are illustrated.

The thus obtained solid product (III) is then combined with an organoaluminum compound (IV) and the above-mentioned aromatic ester to obtain a catalyst, which is used for propylene polymerization in a conventional manner, or preferably further reacted with an α-olefin and used as a preactivated catalyst. As the organoaluminum compound (IV), dialkylaluminum monohalides expressed by the formula $AlR_1R_2X$ are preferable. In the formula, $R_1$ and $R_2$ each represent hydrocarbons such as alkyl group, aryl group, alkaryl group, cycloalkyl group, etc. and alkoxy group, and X represents a halogen of F, Cl, Br or I. Concrete examples are diethylaluminum monochloride, di-n-butylaluminum monochloride and diethylaluminum iodide. In the case of slurry polymerization or bulk polymerization, even a catalyst obtained by combining the solid product (III) with an organoaluminum compound, sufficiently exhibits its effectiveness, but in the case of gas phase polymerization, it is preferred to further react the catalyst with an α-olefin and use the resulting preactivated catalyst having a higher activity. In the case of slurry or bulk polymerization followed by gas phase polymerization, even if the catalyst initially used is the former catalyst, the catalyst used in the gas phase polymerization is the same as the latter catalyst since the catalyst initially used has already reacted with propylene; thus the catalyst exhibits a superior effectiveness.

For the preactivation it is preferred to use 0.1 to 500 g of an organoaluminum, 0 to 50 l of a solvent, 0 to 1,000 ml of hydrogen and 0.05 to 5,000 g, preferably 0.05 to 3,000 g of an α-olefin, each based on 1 g of the solid product (III), and react the α-olefin at 0° to 100° C. for one minute to 20 hours to thereby yield 0.01 to 2,000 g, preferably 0.05 to 200 g, of reacted α-olefin based on 1 g of the solid product (III).

The reaction of an α-olefin for the preactivation can be carried out either in an aliphatic or aromatic hydrocarbon solvent or in a liquefied α-olefin such as liquefied propylene, liquefied butene-1, etc. without using any solvent, and it is also possible to react ethylene, propylene or the like in gas phase. Further it is also possible to carry out the reaction in the coexistence of an α-olefin polymer prepared in advance or hydrogen.

The preactivation process includes various embodiments such as (1) a process wherein an α-olefin is contacted with a catalyst consisting of a combination of the solid product (III) with an organoaluminum to carry out slurry, bulk or gas phase reaction; (2) a process wherein the solid product (III) is combined with an organoaluminum in the presence of an α-olefin; (3) a process wherein an α-olefin polymer is made coexistent in the above process (1) or (2); and (4) a process wherein hydrogen is made coexistent in the above process (1), (2) or (3). In the preactivation, it is also possible to add an aromatic ester (V) in advance.

The α-olefin used for the preactivation includes straight chain monoolefins such as ethylene, propylene, butene-1, hexene-1, heptene-1, etc., branched chain monoolefins such as 4-methyl-pentene-1, 2-methyl-pentene-1, 3-methyl-butene-1, etc. Styrene can also be used. These olefins may be same as or different from α-olefins as the objective of polymerization and also may be used in admixture.

After completion of the preactivation, solvent organoaluminum compound, unreacted α-olefin, etc. may be removed by distilling off under reduced pressure or the like means, to use the resulting product for polymerization in the form of dry powder; or the product may be used in a suspended state in a solvent within a range of amount which does not exceed 80 l per g of the solid product (III); or solvent, unreacted olefin and organoaluminum compound may be removed by filtering off and decantation or further dried, and used in the form of powder. Further it is also possible to add an organoaluminum compound in advance of polymerization.

Using the thus obtained preactivated catalyst, propylene polymerization can be carried out according to slurry polymerization carried out in a hydrocarbon solvent such as n-hexane, n-heptane, n-octane, benzene, toluene, etc., slurry polymerization carried out in liquefied propylene or gas phase polymerization, and for elevating the isotacticity of the resulting propylene polymer, it is necessary to add an aromatic carboxylic acid ester (V) (hereinafter abbreviated to aromatic ester) to the solid product (III) in a molar ratio (V/III) of 0.1 to 10.0. If the amount of an aromatic ester added is less, improvement in the isotacticity is insufficient, while if it is too large, the catalyst activity lowers; hence such outside ratios are not practical. Examples of aromatic esters are ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate, ethyl phenylacetate, etc. The ratio by mol of an organoaluminum compound (IV) to the solid product (III) used (Al/Ti) is in the range of 0.1 to 100, preferably 1 to 20. In this case, the number of mols of the solid product (III) refers to substantially the number of Ti g atoms in (III). As the crystallinity of polymer which enables the present invention to exhibit its effectiveness, the isotactic pentad ratio P (defined later) relative to MFR, of the polymer is in the range of $1 \geq P \geq 0.015 \log MFR + 0.955$. There is a tendency that the higher the MFR value, the higher the P value, and the MFR values are usually in the range of 0.03 to 2.0 g/10 min. The polymerization temperature is in the range of usually 20° to 100° C., preferably 40° to 85° C. Too low temperatures are not practical due to lower catalyst activity. Higher temperatures make elevation of the isotacticity difficult. As to the polymerization pressure, polymerization is carried out under a pressure in the range of the atmospheric one to 50 Kg/cm$^2$G, usually for about 30 minutes to 15 hours. Addition of a suitable amount of hydrogen for adjusting the molecular weight and the like means at the time of polymerization, are the same as those in conventional polymerization processes.

The polypropylene of the present invention is produced as follows: Propylene is polymerized at at least two stages using the above-mentioned catalyst system comprising the solid product (III), an aromatic ester, an organoaluminum compound and a molecular weight modifier. Hydrogen may be used as the molecular weight distribution. The polymerization conditions (temperature, pressure and time) may be applied to the polymerization within known ranges. As for the polymerization form, as far as the multi-stage polymerization of the present invention is possible, any known form of bulk polymerization, suspension polymerization and gas phase polymerization may be employed. A simplest two-stage polymerization will be described below. In the present invention, it is preferred that the amount of the first stage polymer portion (A) be nearly equal to that of the second stage polymer portion (B), and concretely the amounts be both in the range of 35 to 65% by weight based on the total weight of (A) and (B), preferably 40 to 60% by weight. If the ratio of the amounts of (A) and (B) exceeds the above-mentioned range, the resulting polypropylene does not have sufficient melt flow properties, the kneading effectiveness at the time of granulation is insufficient and it is not only difficult to finally obtain a homogeneous molded product, but also the extent of improvement in the melt viscoelasticity is small. Further, the difference between the molecular weights of the two polymer portions should be within a range of definite values as described below in an equation (1). As for the polymerization condition therefor, polymerization is carried out by adjusting the concentration of gas phase hydrogen. Now, if the intrinsic viscosity (as measured in tetralin solution at 135° C.) of the higher molecular weight portion is $[\eta]_H$ and that of the lower molecular weight portion is $[\eta]_L$, then these two viscosities should satisfy the following equation:

$$3.0 \leq [\eta]_H - [\eta]_L \leq 6.5 \tag{1}$$

This relationship substantially corresponds to the above-mentioned relationship (2). Namely if $[\eta]_H - [\eta]_L < 3.0$, then log HMI $< 0.922$ log MI $+ 1.44$. Thus the melt flow characteristics of polypropylene at the time of its melting for processing is insufficient and the extent of improvement in the melt viscoelasticity is also insufficient to make it impossible to prevent sag of sheet at the time of its secondary processing. Contrarily if $[\eta]_H - [\eta]_L > 6.5$, then the difference between the molecular weights of the two portions (A) and (B) becomes excessive to enlarge the non-uniformity of the molecular weights of the resulting polypropylene particles, and as a result, molded products produced from such a polypropylene have a much roughened surface.

In the present invention, propylene alone is not only used, but also propylene may be used together with another monomer within a range which is not harmful to satisfaction of the object of the present invention. Although such another monomer is not limited, for example, α-olefins such as ethylene, butene-1, hexene-1, 4-methylpentene-1, etc. and vinyl compounds such as styrene, vinylhexane, divinylbenzene, etc. may be illustrated. Such a copolymerization may be applied to either one of the above-mentioned (A) or (B) or both of (A) and (B). Particularly the method of using ethylene at the same time may be applied to any stage of polymerizations of the present invention, and if the amount of ethylene used during one stage is 50% by weight or less and the ethylene content in the total polymer is in the range of 1 to 15% by weight, preferably 2 to 10% by weight, then it is possible to obtain desirable processing physical properties aimed in the present invention.

The melt flow index (MI) of the thus obtained polypropylene of the present invention is preferred to be 0.03 to 2.0 g/10 min. If it is less than 0.03 g/10 min., melt flow properties at the time of granulation or molding processing are inferior; hence much power is required to thereby make the process uneconomical and the surface roughening of the resulting molded products is notable to thereby lose their commodity value. Further if it exceeds 2, the sag of produced sheet at the time of the secondary processing is so large that the processing becomes difficult. In addition, the above-mentioned equation (1) indicates a polymer-designing method which is necessary for imparting to polypropylene, a viscoelasticity capable of preventing the sag of a material to be molded at the time of thermoforming of polypropylene sheet or at the time of blow molding of polypropylene. Similarly, the above-mentioned equation (2) indicates flow properties of polypropylene, and polypropylene of the present invention having a polymer structure of the equation (1) satisfies the condition of the equation (2).

Polypropylene for high-rigid molded products of the present invention is broadly applicable to various molding fields and can exhibit its effectiveness.

For example, in the injection molding field, the following effectiveness is exhibited: an effectiveness of expanding the field where polypropylene has been used, as far as the fields of high-rigidity polymers such as polystyrene, ASB resin, etc., where propylene has heretofore been impossible to use; an effectiveness of quality improvement due to creation of high-rigidity molded products; and an effectiveness of making molded products thinner than conventional products, due to creation of high-rigidity molded products. Thus, it is possible to expect an effectiveness of resources-saving, cost down due to improvement in the molding rate, etc. Further, when a nucleus-creating agent or an inorganic filler is used at the same time, it is possible to achieve a high rigidity which conventional products could have never achieved, and in the case where it is sufficient to maintain a resin on a similar rigidity level to those of conventional products, it is possible to save the amount of the resin used. Similarly, in the field of films, it is possible to exhibit an effectiveness of improving operability at the time of automatic packaging, etc. by rigidity improvement, and effecting cost reduction by making molded products thinner.

The methods for measuring the values of physical properties in Examples and Comparative examples described hereinafter are as follows:

(1) Melt flow index (MI): according to ASTM D-1238. A load of 2.16 Kg was used. Melt flow index (HMI): according to ASTM D-1238. A load of 10.8 Kg was used.

(2) Intrinsic viscosity $[\eta]$: measured in tetralin at 135° C.

The intrinsic viscosity at the second stage $[\eta]_2$ was sought according to the following equation. Namely, in this measurement, the intrinsic viscosity at the first stage $[\eta]_1$, the intrinsic viscosity $[\eta]_T$ of the total polymer formed throughout the first stage and the second stage, and the proportions by weight, a and b of the respective polymer portions formed at the first stage and the second stage were measured, and then the intrinsic viscosity at the second stage $[\eta]_2$ was calculated from the following equation:

$$[\eta]_T = a[\eta]_1 + b[\eta]_2 = a[\eta]_1 + (1-a)[\eta]_2$$

(3) Isotactic pentad ratio (P): This was measured based on Macromolecules 8 687 (1975), and refers to an isotactic ratio in terms of pentad units in polypropylene molecular chain, measured using $^{13}$C-NMR.

(4) Young's modulus: according to ASTM D 888 (Kg f/mm$^2$).

(5) Tensile yield strength: according to ASTM D882 (Kg f/mm$^2$).

The above properties (4) and (5) are shown in terms of an average value of TD and M, respectively, in Examples.

The present invention will be further concretely described below by way of Examples, but it should not be construed to be limited thereto.

EXAMPLE 1

(1) Preparation of catalyst n-Hexane (600 ml), diethylaluminum monochloride (DEAC) (0.50 mol), diisoamyl ether (1.20 mol) were mixed together at 25° C. for one minute and reacted at the same temperature for 5 minutes to obtain a reaction liquid (VI) (molar ratio of diisoamyl ether/DEAC: 2.4). TiCl$_4$ (4.0 mols) was placed in a nitrogen gas-purged reactor and heated to 35° C., followed by dropwise adding the total amount of the reaction liquid (VI) over 180 minutes, keeping the temperature at the same temperature for 30 minutes, raising the temperature up to 75° C., reacting them for one hour, cooling the resulting reaction material down to room temperature, removing the supernatant, and 4 times repeating a procedure of adding n-hexane (4,000 ml) and removing the supernatant by decantation, to obtain a solid product (II) (190 g). The total amount of this product (II) was suspended in n-hexane (3,000 ml), and to the resulting suspension were added diisoamyl ether (160 g) and TiCl$_4$ (350 g) at room temperature (20° C.) over about one minute, followed by reacting them at 65° C. for one hour, cooling the resulting reaction material down to room temperature (20° C.), removing the supernatant by decantation, 5 times repeating a procedure of adding n-hexane (4,000 ml), stirring for 10 minutes, allowing to still stand and removing the supernatant and drying under reduced pressure, to obtain a solid product (III).

(2) Preparation of preactivated catalyst

Into a 20 l capacity stainless steel reactor equipped with slant blades, after purged by nitrogen gas, were added at room temperature, n-hexane (15 l), diethylaluminum monochloride (42 g), and the above solid product (III) (30 g), followed by introducing hydrogen (15 Nl), reacting them under a propylene partial pressure of 5 Kg/cm$^2$G for 5 minutes, and removing unreacted propylene, hydrogen and n-hexane under reduced pressure, to obtain a preactivated catalyst (VII) in the form of powder (reacted propylene per g of the solid product (III): 82.0 g).

(3) Propylene polymerization

Into a 50 l capacity polymerization vessel purged with nitrogen gas were fed n-hexane (20 l), diethylaluminum monochloride (8 g), the preactivated catalyst (VII) obtained above (2 g) and methyl p-toluylate (2.2 g), followed by adding hydrogen, keeping the temperature inside the vessel at 70° C., and feeding propylene into the vessel, to carry out the first stage polymerization under a pressure inside the vessel, of 10 Kg/cm$^2$, in a hydrogen concentration in the gas phase, of 11% and at a temperature of 70° C. When the amount of propylene polymerized reached 3 Kg, propylene feed was stopped, followed by lowering the temperature inside the vessel down to room temperature, releasing hydrogen and unreacted propylene, withdrawing a portion of the polymerization slurry obtained and carrying out measurement of $[\eta]$ and analysis of Ti content in the polymer according to fluorescent X-ray method, to obtain the polymer yield per unit weight of catalyst.

The temperature inside the vessel was then again raised to 70° C. to carry out the second stage polymerization while the polymerization pressure and the gas phase hydrogen concentration were kept at 10 Kg/cm$^2$G and 0.4%, respectively. When the amount of propylene polymerized at the second stage reached 3 Kg, the propylene feed was stopped, followed by lowering the temperature inside the vessel down to room temperature and releasing hydrogen and unreacted propylene. A portion of the polymerization slurry obtained was then withdrawn, and measurement of $[\eta]_T$ and analysis of Ti content in the polymer according to fluorescent X-ray method were carried out to obtain the polymer yield per unit weight of catalyst, followed by calculating the ratio of the amount of propylene polymerized at the first stage to that at the second stage from the above-mentioned polymer yield value at the first stage. Methanol (5 l) was added to the polymerization slurry after the above-mentioned release, and the mixture was agitated at 90° C. for 30 minutes, followed by adding a 20% aqueous solution of NaOH (40 ml), further agitating the mixture for 20 minutes, cooling down to room temperature, adding water (5 l), three times repeating water-washing and water-separation, filtering off the resulting slurry and drying to obtain white polymer powder. The analytical results of this polymer are shown in Table 1.

(4) Production and evaluation of sheet:

To the white polymer powder (5 Kg) obtained above in the item (3) were added BHT (2,6-di-t-butyl-p-cresol) (5 g), Irganox 1010 (tetrakis{methylene(3,5-di-t-butyl-4-hydroxy hydrocinnamate}methane) (2.5 g) and calcium stearate (10 g), followed by granulation. The resulting granulate was molded by an extrusion molding machine of 50 mmϕ at 225° C. to obtain a sheet of 60 cm wide and 0.4 mm thick. In order to evaluate the heat vacuum formability of this sheet in a model manner, the sheet was fixed onto a frame of 40 cm×40 cm and placed in a temperature controlled chamber to measure the following physical properties: (i) sag amount of sheet (mm), (ii) maximum recovery amount (1/150×(150−sag amount at the time of maximum recovery)×100) and (iii) retention time since the time of maximum recovery till the time of reopening of sag.

COMPARATIVE EXAMPLES 2 and 3

Example 1 was repeated except that the hydrogen concentrations at the first stage and the second stage were made 3.2% and 50% and 0.2% and 0.015% in the order of the numbers of the Comparative examples, respectively. The results are shown in Table 1. As apparent from comparative examples 1 and 2, if the difference between the molecular weights of the polymer portions at the first stage and the second stage is nil or slight, then log HMI−0.922 log MI<1.44 and the vacuum formability of the resulting polymer was bad.

On the other hand, if the difference between the $[\eta]$s of the polymer portions at the first stage and the second stage is too large as in Comparative example 3, the surface roughening of sheet increases, which results in loosing the commodity value of molded products, although the vacuum formability is good. As a result, in order to impart a sufficient vacuum formability to the polymer of the present invention, it is preferable that $[\eta]_H - [\eta]_L \geq 3.0$, and in order to prevent the surface roughening of sheet, it is necessary that $[\eta]_H - [\eta]_L \leq 6.5$, as described above.

TABLE 1

| | | Polymerization Conditions and Physical Properties of Polymer (I) | | | | | | |
|---|---|---|---|---|---|---|---|---|
| | | Example | | | | Comparative example | | |
| Section | Item | 1 | 2 | 3 | 4 | 1 | 2 | 3 |
| First stage | $[\eta]_1$ dl/g | 1.95 | 2.10 | 1.15 | 0.80 | 3.70 | 2.51 | 0.12 |
| | Polymerization Wt. % proportion | 47 | 49 | 53 | 52 | 100 | 49 | 51 |
| Second stage | $[\eta]_2$ dl/g | 5.10 | 5.96 | 5.87 | 6.74 | — | 5.07 | 7.33 |
| | Polymerization Wt. % proportion | 53 | 51 | 47 | 48 | — | 51 | 49 |
| Total polymer | (P) | 0.967 | 0.962 | 0.969 | 0.963 | 0.962 | 0.964 | 0.966 |
| | MI g/10 min. | 0.44 | 0.28 | 0.62 | 0.43 | 0.38 | 0.35 | 0.40 |
| | HMI g/10 min. | 13.5 | 11.2 | 22.4 | 18.6 | 8.1 | 9.0 | 17.8 |
| | log HMI−0.922 log MI | 1.46 | 1.56 | 1.54 | 1.64 | 1.30 | 1.37 | 1.62 |
| | $[\eta]_T$ dl/g | 3.62 | 4.07 | 3.37 | 3.65 | 3.70 | 3.82 | 3.65 |
| | $[\eta]_H - [\eta]_L$ | 3.15 | 3.86 | 4.72 | 5.94 | — | 2.56 | 7.21 |
| Sheet | Appearance (Heat behavior) | Good | Good | Good | Good | Good | Good | Bad |
| | Amount of sag mm | 35 | 33 | 31 | 29 | 44 | 41 | 30 |
| | Recovered amount % | 82 | 85 | 83 | 90 | 68 | 75 | 91 |
| | Retention time sec. | 18 | 24 | 21 | 23 | 8 | 12 | 22 |
| | Young's modulus Kg/mm$^2$ | 141 | 138 | 142 | 140 | 137 | 139 | 141 |
| | Tensile yield strength Kg/mm$^2$ | 4.62 | 4.54 | 4.70 | 4.57 | 4.53 | 4.58 | 4.67 |

The results are shown in Table 1 together with Young's modulus and tensile yield strength. Materials regarded as superior in the vacuum formability by these evaluation methods refer to those having a small sag amount, a large recovery amount and a long retention time. Further, the high-rigidity materials herein refer to those having a Young's modulus and tensile yield strength.

EXAMPLES 2~4

Example 1 was repeated except that the hydrogen concentrations at the first stage and the second stage were made 5, 14 and 25% and 0.07, 0.08 and 0.03% in the order of the numbers of Examples 2~4, respectively. The results are shown in Table 1.

COMPARATIVE EXAMPLE 1

Example 1 was repeated except that the hydrogen concentration and the polymer yield at the first stage were made 0.8% and 6 Kg, respectively, and the polymerization at the second stage was omitted. The results are shown in Table 1.

EXAMPLES 5 AND 6

Example 1 was repeated except that the hydrogen concentrations at the first stage and the second stage were made 18% and 5.0% and 0.09% and 0.03% in the order of the numbers of these Examples, respectively, and the polymerization ratios at the first stage and the second stage were made 4:6 and 6:2, respectively. The results are shown in Table 2.

COMPARATIVE EXAMPLES 4 and 5

Example 1 was repeated except that the hydrogen concentrations at the first stage and the second stage were made 21% and 3% and 0.35% and 0.015% in the order of the numbers of these Comparative examples, respectively. The results are shown in Table 2.

COMPARATIVE EXAMPLES 6 and 7

Example 1 was repeated except that the hydrogen concentrations at the first stage and the second stage were made 1.0% and 25% and 0.025% and 0.35% in the order of the numbers of these Comparative examples, respectively. The results are shown in Table 2. As seen from Table 2, since the polymer of Comparative example 6 was too low in MI and bad in melt flow, it was impossible to mold the polymer into a good sheet. Contrarily, since the polymer of Comparative example 7 was too high in MI, the molded sheet, when heated, sagged and did not recover its original state.

EXAMPLE 7

Example 1 was repeated except that the hydrogen concentrations at the first stage and the second stage were made 0.10% and 13%, respectively. The results are shown in Table 2. As apparent from Table 2, the higher molecular weight polymer portion may be prepared at the first stage as in this Example, or may be prepared at the second stage as in Example 1.

COMPARATIVE EXAMPLE 10

Example 1 was repeated except that the preactivated catalyst (VII) was replaced by a commercially available catalyst (AA type) (8 g) obtained by reducing $TiCl_4$ with metal aluminum and milling the resulting material for activation and methyl toluylate (8.8 g) was used, and further the hydrogen concentrations at the first stage and the second stage were made 7.5% and 0.08%, respectively. The results are shown in Table 3.

COMPARATIVE EXAMPLE 11

Anhydrous $MgCl_2$ (20 g), ethyl benzoate (10 ml) and methylpolysiloxane (6 ml) were milled in a ball mill for 100 hours. The resulting solid product (15 g) was suspended in $TiCl_4$ (200 ml) and agitated at 80° C. for 2

TABLE 2

| | | Polymerization Conditions and Physical Properties of Polymer (II) | | | | | | |
|---|---|---|---|---|---|---|---|---|
| | | Example | | | Comparative example | | | |
| Section | Item | 5 | 6 | 7 | 4 | 5 | 6 | 7 |
| First stage | $[\eta]_1$ dl/g | 1.06 | 2.10 | 5.72 | 0.85 | 2.51 | 3.49 | 0.71 |
| | Polymerization Wt. % proportion | 41 | 62 | 51 | 24 | 78 | 53 | 50 |
| Second stage | $[\eta]_2$ dl/g | 5.64 | 6.81 | 1.24 | 4.51 | 7.24 | 6.98 | 4.37 |
| | Polymerization Wt. % proportion | 59 | 38 | 49 | 76 | 22 | 47 | 50 |
| Total polymer | (P) | 0.967 | 0.958 | 0.968 | 0.961 | 0.963 | 0.941 | 0.973 |
| | MI g/10 min. | 0.43 | 0.28 | 0.53 | 0.45 | 0.50 | 0.01 | 3.5 |
| | HMI g/10 min. | 13.5 | 9.8 | 23.5 | 11.3 | 12.0 | 0.72 | 90 |
| | log HMI-0.922 log MI | 1.47 | 1.50 | 1.63 | 1.37 | 1.36 | 1.70 | 1.45 |
| | $[\eta]_T$ dl/g | 3.76 | 3.89 | 3.52 | 3.63 | 3.55 | 5.13 | 2.54 |
| | $[\eta]_H - [\eta]_L$ | 4.58 | 4.71 | 4.48 | 3.66 | 4.73 | 3.49 | 3.66 |
| Sheet | Appearance (Heat behavior) | Good | Good | Good | Bad | Bad | Worse*[1] | Good |
| | Amount of sag mm | 38 | 36 | 32 | 42 | 44 | — | —*[2] |
| | Recovered amount % | 84 | 85 | 85 | 72 | 71 | — | — |
| | Retention time sec. | 18 | 20 | 24 | 12 | 10 | — | — |
| | Young's modulus Kg/mm$^2$ | 140 | 135 | 145 | 134 | 138 | — | 147 |
| | Tensile yield strength Kg/mm$^2$ | 4.61 | 4.48 | 4.69 | 4.50 | 4.54 | — | 4.72 |

Note
*[1] Sheet production was impossible due to bad flow.
*[2] Sheet, when heated, sagged and did not recover its original state.

EXAMPLE 8

Example 1 was repeated except that the hydrogen concentrations at the first stage and the second stage were made 18% and 0.06%, respectively. The resulting polymer was granulated into pellets, from which a 10 l bottle was produced according to blow molding in place of sheet forming. This bottle was good in appearance and small in unevenness of thickness. Namely, the ratio of the thickness of the bottle at the uppermost part of the shell to that at a part close to the lowermost part thereof was as good as 0.92. Other polymerization results are shown in Table 3.

COMPARATIVE EXAMPLES 8 and 9

Polymerization of the present invention and blow molding were carried out in the same manner as in Example 8 except that the hydrogen concentrations at the first stage and the second stage were made 1.2% and 45% and 0.70% and 0.015% in the order of the numbers of these Comparative examples, respectively. The unevenness of thickness of the resulting bottle in the case of Comparative example 8 was as bad as 0.63, and that in the case of Comparative example 9 was as good as 0.89, but this molded product had a great surface-roughening to make the appearance bad. Other polymerization results are shown in Table 3.

hours, followed by removing the liquid by filtration, washing with n-hexane till no $TiCl_4$ was detected in the filtrate, and drying to obtain a solid catalyst. Example 1 was then repeated except that this solid product (2 g) was substituted for the preactivated catalyst (VII) of Example 1; addition of MPT was omitted and TEA (2 g) was used; and the hydrogen concentrations at the first stage and the second stage were made 4.5% and 0.05%, respectively. The results are shown in Table 3.

COMPARATIVE EXAMPLE 12

In the reaction for preparing the solid product (II) in Example 1, the reaction liquid (VI) was replaced by DEAC (0.5 mol), which was dropwise added as in Example 1 at 0° C. in place of 35° C., followed by raising the temperature up to 75° C., further stirring for reaction for one hour, refluxing at the boiling temperature of $TiCl_4$ (about 136° C.) for 4 hours to convert the material into a violet material, cooling, washing with n-hexane, filtering and drying as in Example 1 to obtain a solid catalyst. Example 1 was then repeated except that this solid catalyst (8 g) was substituted for the solid catalyst (VII); methyl toluylate (8.8 g) was used; and the hydrogen concentrations at the first stage and the second stage were made 4.5% and 0.07%, respectively. The results are shown in Table 3. As apparent from Comparative examples 10, 11 and 12, if catalysts other than the catalyst of the present invention are used, it is impossible to obtain a high-rigidity polypropylene as in the present invention, even if an aromatic ester is added.

the aromatic ester is less than those in the range of the present invention as in Comparative example 13, improvement in rigidity is insufficient, while if the amount

TABLE 3

Polymerization Conditions and Physical Properties of Polymer (III)

| Section | items | Example 8 | Comparative example 8 | 9 | 10 | 11 | 12 |
|---|---|---|---|---|---|---|---|
| Catalyst | Kind (type) | Catalyst of present invention | Same as left | Same as left | AA type | Supported type | Organoaluminum-reduced type |
| First stage | $[\eta]_1$ dl/g | 0.88 | 3.25 | 0.46 | 1.96 | 2.05 | 2.16 |
| | Polymerization Wt. % proportion | 48 | 51 | 53 | 52 | 48 | 54 |
| Second stage | $[\eta]_2$ dl/g | 6.03 | 3.67 | 7.58 | 5.68 | 5.86 | 5.93 |
| | Polymerization Wt. % proportion | 52 | 49 | 47 | 48 | 52 | 46 |
| Total polymer | (P) | 0.959 | 0.964 | 0.961 | 0.934 | 0.908 | 0.938 |
| | MI g/10 min. | 0.48 | 0.60 | 0.39 | 0.40 | 0.28 | 0.34 |
| | HMI g/10 min. | 20.5 | 13.8 | 17.5 | 13.6 | 9.5 | 12.5 |
| | log HMI-0.922 log MI | 1.60 | 1.34 | 1.62 | 1.50 | 1.49 | 1.53 |
| | $[\eta]_T$ dl/g | 3.56 | 3.46 | 3.80 | 3.75 | 4.03 | 3.89 |
| | $[\eta]_H-[\eta]_L$ | 5.15 | 0.47 | 7.12 | 3.72 | 3.81 | 3.77 |
| Sheet | Appearance (Heat behavior) | | (Blow-molded product) | | Good | Good | Good |
| | Amount of sag mm | | | | 34 | 32 | 32 |
| | Recovered amount % | | | | 86 | 88 | 84 |
| | Retention time sec. | | | | 19 | 21 | 22 |
| | Young's modulus Kg/mm$^2$ | | | | 107 | 85 | 115 |
| | Tensile yield strength Kg/mm$^2$ | | | | 3.97 | 3.42 | 4.11 |

EXAMPLES 9, 10 and 11

In Example 1, the amount of MPT was vaired as shown in Table 4, and further the hydrogen concentrations at the first stage and the second stage were made 4.5%, 6.5% and 9.0% and 0.07%, 0.12% and 0.14% in the order of the numbers of these Examples, respectively. The results are shown in Table 4.

COMPARATIVE EXAMPLES 13 and 14

In Example 1, the amount of MPT was varied as shown in Table 4, and further the hydrogen concentrations at the first stage and the second stage were made 3.5% and 11.0% and 0.06% and 0.15% in the order of the numbers of these Comparative examples, respectively. Further, in Comparative example 14, the amounts of propylene polymerized at the first stage and the second stage were both made 0.5%. If the amount exceeds those in the range of the present invention, the polymerization rate is extremely low; hence the amounts outside the range are not practical.

TABLE 4

Polymerization Conditions and Physical Properties of Polymer (IV)

| Section | Item | Example 9 | 10 | 11 | Compar. ex. 13 | 14 |
|---|---|---|---|---|---|---|
| Catalyst | Mol ratio of MPT/solid product | 0.5 | 2.0 | 5.0 | 0.05 | 15 |
| First stage | $[\eta]_1$ dl/g | 1.87 | 1.95 | 1.85 | 1.92 | 1.93 |
| | Polymerization proportion Wt. % | 49 | 52 | 51 | 48 | 49 |
| Second stage | $[\eta]_2$ dl/g | 5.73 | 5.62 | 5.77 | 5.67 | 5.77 |
| | Polymerization proportion Wt. % | 51 | 48 | 49 | 52 | 51 |
| Total polymer | (P) | 0.955 | 0.974 | 0.972 | 0.934 | 0.970 |
| | MI g/10 min. | 0.29 | 0.36 | 0.34 | 0.26 | 0.25 |
| | HMI g/10 min. | 11.5 | 15.8 | 14.1 | 10.7 | 10.4 |
| | log HMI-0.922 log MI | 1.56 | 1.61 | 1.58 | 1.57 | 1.57 |
| | $[\eta]_T$ dl/g | 3.84 | 3.71 | 3.77 | 3.87 | 3.89 |
| | $[\eta]_H-[\eta]_L$ | 3.86 | 3.67 | 3.92 | 3.75 | 3.84 |
| Sheet | Appearance (Heat behavior) | Good | Good | Good | Good | —*3 |
| | Amount of sag mm | 31 | 32 | 32 | 33 | — |
| | Recovered amount % | 85 | 83 | 87 | 84 | — |
| | Retention time sec. | 21 | 19 | 22 | 21 | — |
| | Young's modulus Kg/mm$^2$ | 128 | 152 | 149 | 108 | — |
| | Tensile yield strength Kg/mm$^2$ | 4.40 | 4.57 | 4.74 | 3.98 | — |

Note
*3 Amount of propylene polymerized was as small as 2 Kg to make sheet evaluation impossible

EXAMPLES 12, 13, 14, 15, 16 and 17

Example 1 was repeated except that the hydrogen concentrations at the first stage and the second stage were made 13% and 0.06%, respectively, and MPT was replaced by the following aromatic esters:

| | | | Symbol |
|---|---|---|---|
| Example 12: | Ethyl p-toluylate | 2.4 g: | a, |
| Example 13: | Butyl p-toluylate | 2.8 g: | b, |
| Example 14: | Methyl benzoate | 2.0 g: | c, |
| Example 15: | Ethyl benzoate | 2.2 g: | d, |
| Example 16: | Methyl p-anisate | 2.4 g: | e, and |

-continued

|  |  |  | Symbol |
|---|---|---|---|
| Example 17: | Ethyl p-anisate | 2.6 g: | f. |

The results are shown in Table 5.

EXAMPLES 18, 19 and 20

Example 1 was repeated except that the hydrogen concentrations at the first stage and the second stage were made 13% and 0.06%, respectively, and the organoaluminum compound DEAC was replaced by the following:

|  |  | Symbol |
|---|---|---|
| Example 18: | Di-n-propylaluminum monochloride: | g, |
| Example 19: | Di-i-butylaluminum monochloride: | h, and |
| Example 20: | Di-ethylaluminum monoiodide: | i. |

The results are shown in Table 5.

TABLE 5

Polymerization Conditions and Physical Properties of Polymer (V)

| Item | Example 12 | 13 | 14 | 15 | 16 | 17 | 18 | 19 | 20 |
|---|---|---|---|---|---|---|---|---|---|
| Kind of aromatic esters (a~f) or org. Al (g~i) | a | b | c | d | e | f | g | h | i |
| (First stage) |  |  |  |  |  |  |  |  |  |
| $[\eta]_1$ dl/g | 1.14 | 1.06 | 1.25 | 1.18 | 1.09 | 1.13 | 1.16 | 1.18 | 1.10 |
| Polymerization Wt. % proportion | 55 | 49 | 53 | 51 | 47 | 48 | 50 | 48 | 48 |
| (Second stage) |  |  |  |  |  |  |  |  |  |
| $[\eta]_2$ dl/g | 6.10 | 5.88 | 5.81 | 5.90 | 6.00 | 5.99 | 6.01 | 5.97 | 5.92 |
| Polymerization Wt. % proportion | 45 | 51 | 47 | 49 | 53 | 52 | 50 | 52 | 52 |
| (Total polymer) |  |  |  |  |  |  |  |  |  |
| (P) | 0.957 | 0.961 | 0.964 | 0.956 | 0.959 | 0.968 | 0.958 | 0.955 | 0.972 |
| MI g/10 min. | 0.27 | 0.46 | 0.63 | 0.55 | 0.38 | 0.43 | 0.46 | 0.39 | 0.45 |
| HMI | 12.5 | 18.5 | 25.4 | 24.1 | 18.5 | 18.7 | 20.1 | 17.5 | 19.8 |
| log HMI-0.922 log MI | 1.61 | 1.58 | 1.59 | 1.62 | 1.65 | 1.61 | 1.61 | 1.62 | 1.62 |
| $[\eta]_T$ | 3.89 | 3.52 | 3.37 | 3.49 | 3.69 | 3.66 | 3.59 | 3.67 | 3.61 |
| $[\eta]_H - [\eta]_L$ | 4.96 | 4.82 | 4.60 | 4.72 | 4.91 | 4.86 | 4.85 | 4.79 | 4.82 |
| (Sheet) |  |  |  |  |  |  |  |  |  |
| Appearance | Good | Good | Good | Good | Good | Good | Good | Good | Good |
| (Heat behavior) |  |  |  |  |  |  |  |  |  |
| Amount of sag mm | 28 | 31 | 34 | 33 | 31 | 32 | 32 | 33 | 33 |
| Recovered amount % | 88 | 85 | 83 | 84 | 87 | 86 | 86 | 87 | 84 |
| Retention time sec. | 25 | 22 | 18 | 19 | 24 | 22 | 21 | 23 | 20 |
| Young's modulus Kg/mm$^2$ | 128 | 132 | 137 | 126 | 133 | 144 | 140 | 126 | 154 |
| Tensile yield strength Kg/mm$^2$ | 4.47 | 4.51 | 4.59 | 4.52 | 4.63 | 4.66 | 4.53 | 4.35 | 4.78 |

What is claimed is:

1. A process for producing a high-rigidity and high-melt-viscoelasticity polypropylene for sheets to be post-processed and for blow molding, obtained by subjecting propylene to a multi-stage polymerization in the presence of a catalyst prepared by reacting an organoaluminum compound (I) or a reaction product of an organoaluminum compound (I) with an electron donor (A), with TiCl$_4$ (C); reacting the resulting solid product (II) with an electron donor (A) and an electron acceptor (B); and combining the resulting solid product (III) with an organoaluminum compound (IV) and an aromatic carboxylic acid ester (V), so as to give a molar ratio (V/VIII) of the aromatic carboxylic acid ester to the solid product (III) of 0.1 to 10.0;

in this polymerization, adjusting the amount of propylene polymerized at the first stage so as to constitute 35 to 65% by weight based on the total amount polymerized and that at the second stage et seq so as to constitute 65 to 35% by weight based thereon; and when the intrinsic viscosity of the polymer portion having a higher molecular weight is named $[\eta]_H$ and that having a lower molecular weight is named $[\eta]_L$, between the polymer portion formed at the first stage and that formed at the second stage et seq, adjusting the intrinsic viscosity values of the respective polymer portions so as to satisfy a relationship $$3.0 \leq [\eta]_H - [\eta]_L \leq 6.5 \qquad (1).$$

2. A process for producing a polypropylene according to claim 1, having a melt flow index (MI) in the range of 0.03 to 2.0 g/10 min.

3. A process for producing a polypropylene according to claim 1 wherein said organoaluminum compound (IV) is a dialkylaluminum monohalide.

4. A process for producing a polypropylene according to claim 1 wherein an α-olefin is reacted with the combination of said solid product (III) with said organoaluminum compound (IV) and said aromatic carboxylic acid ester, and the resulting preactivated catalyst is used.

5. A process for producing a polypropylene according to claim 1 wherein the relationship between its isotactic pentad ratio (P) and MFR is adjusted to be in the range of $$1.0a \geq P \geq 0.015 \log MFR + 0.955.$$

6. A process for producing a polypropylene according to claim 1 wherein the relationship between its melt flow index (HMI) (10.8 Kg/10 min., 230° C.) and melt flow index (MI) (2.16 Kg/10 min., 230° C.) is adjusted to satisfy an equation $$\log HMI - 0.922 \log MI \geq 1.44 \qquad (2).$$

* * * * *